United States Patent Office 3,354,868
Patented Nov. 28, 1967

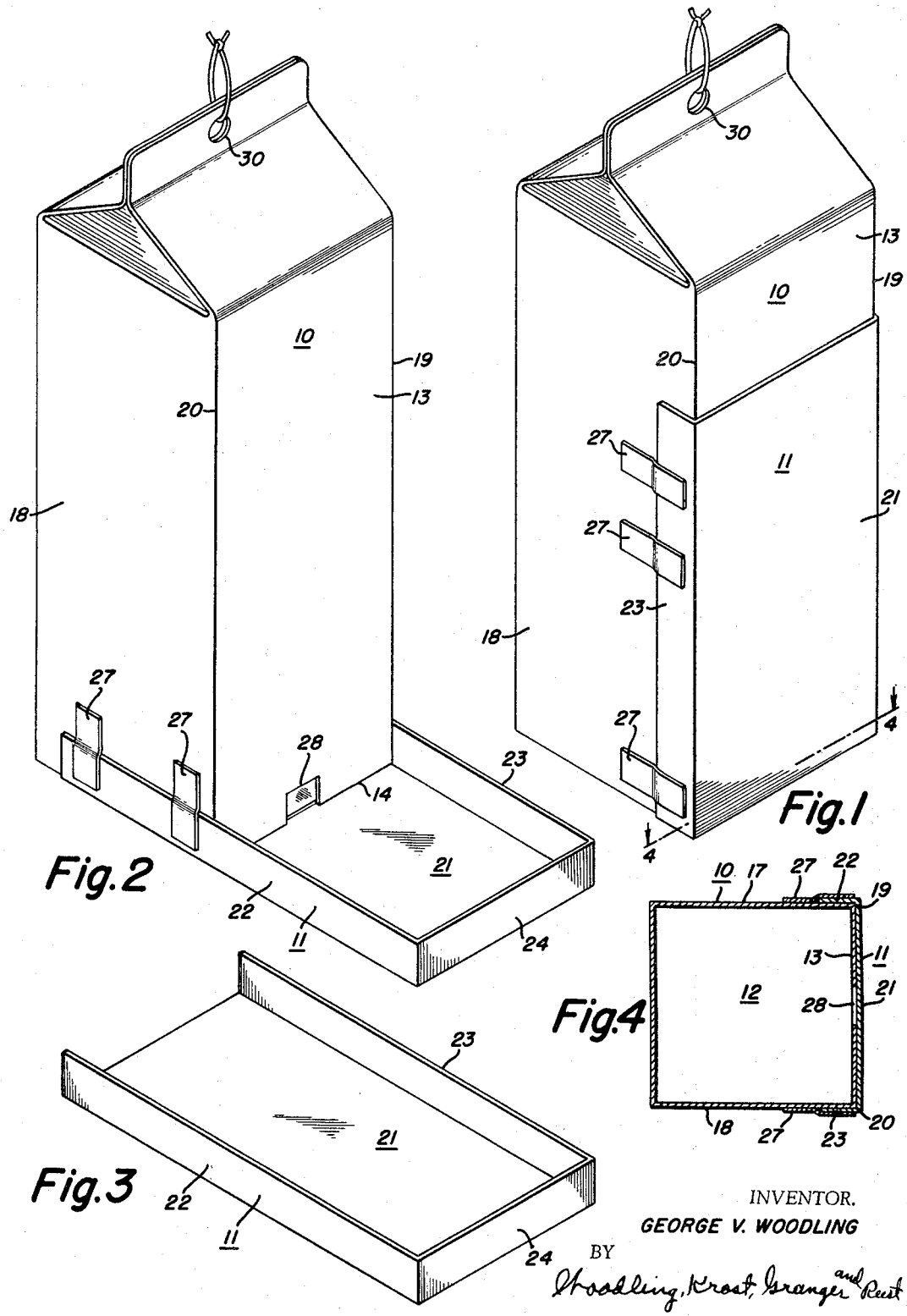

3,354,868
COMBINATION PACKAGED CONTAINER AND
BIRD SEED FEEDER MEANS
George V. Woodling, 22077 W. Lake Road,
Rocky River, Ohio 44116
Filed Apr. 22, 1966, Ser. No. 544,473
7 Claims. (Cl. 119—52)

My invention relates to a combination packaged container and bird seed feeder means.

In the trade, bird seed is sold in separate packages, including sacks, cartons or boxes. The purchaser, upon taking a package to his home, then transfers the bird seed, as the occasion requires, to one or more bird feeders which he has located about the premises.

With my invention, the packaged container is also the bird feeder, which eliminates the necessity of transferring the seed to one or more bird feeders.

An object of my invention is the provision of a bird seed packaged container which is also a bird feeder.

Another object is to eliminate the necessity of transfeering the bird seed from the packaged container in which it is sold to one or more bird feeders located about the premises.

Another object is the provision of a bird seed feeder means positionable relative to said packaged container in first and second positions whereby, when the packaged container is being shipped or stored, the bird seed feeder means is disposed in said first position close to and along a side of the packaged container so that there is no interference to shipping and storage, and whereby, when the purchaser takes the packaged container to his home, he can readily reposition the bird seed feeder means to said second position so that the packaged container is converted into a bird feeder.

Another object is to employ the conventional milk carton as the packaged container.

Another object is to construct the bird seed feeder means of metal or of the same material as that of a milk carton.

Another object is to use waterproof adhesive tape means to secure the bird seed feeder means to the packaged container.

Another object is the provision of a combination packaged container and bird seed feeder means which is readily disposable when the bird seed becomes exhausted.

Other objects and a fuller understanding of the invention may be had by referring to the following description and claims, taken in conjunction with the accompanying drawing, in which:

FIGURE 1 is an isometric view of a combination packaged container and bird seed feeder means, showing the bird seed feeder means positioned in a first position close to and along a side of the packaged container, whereby there is no interference to shipping and storage;

FIGURE 2 is an isometric view of a combination packaged container bird seed feeder means showing the bird seed feeder means positioned in a second or operative position, whereby the packaged container is converted into a bird feeder;

FIGURE 3 is an iometric view of the bird seed feeder means; and

FIGURE 4 is a cross-sectional view taken along the line 4—4 of FIGURE 1.

With reference to the drawings, the reference character 10 represents a packaged container and the reference character 11 represents a bird seed feeder means. The packaged container is preferably a conventional milk carton made of waterproof material. The bird seed feeder means may be constructed of metal, such as sheet aluminum, or it may be constructed of the same waterproof material as that of the milk carton. I find that a milk carton will withstand the weather for a much longer period of time than that during which the bird seed will last, after which the combination container feeder may be disposed of.

In the drawing, the packaged container 10 has a base panel means 12 and a first or front side panel 13 which meets with the base panel means 12 to define a first corner edge 14. The packaged container 10 also has second and third opposed side panels 17 and 18 interconnected by the first or front side panel 13. The second opposed side panel 17 meets with the first or front side panel 13 and defines therewith a second corner edge 19 which is substantially perpendicular to the first corner edge 14 and which extends upwardly from the right-hand end thereof. The third opposed side panel 18 meets with the first or front side panel 13 and defines therewith a third corner edge 20 which is substantially perpendicular to the first corner edge 14 and which extends upwardly from the left-hand end thereof.

The bird seed feeder means 11 comprises utility panel means including a tray or bottom panel 21, first and second opposed side marginal flange means 22 and 23, and a third end marginal flange means 24. The bird seed feeder means 11 is positionable relative to the packaged container 10 in first and second positions, shown respectively in FIGURES 1 and 2. In the first position, as shown in FIGURE 1, the bird seed feeder means 11 has the tray panel 21 disposed against the first or front side panel 13 with the first and second opposed side marginal flange means 22 and 23 respectively extending beyond the second and third corner edges 19 and 20 and thence respectively embracing the second and third opposed side panels 17 and 18 and with the third end marginal flange means 24 extending beyond the first corner edge 14 and thence embracing the base panel means 12. The bird seed feeder means 11 may be secured in the first position to the packaged container by any suitable means. I find that a waterproof adhesive tape, such as freezer tape, is very satisfactory. It may be taped with several pieces, as indicated by the reference character 27. In the first position of the bird seed feeder means 11, the tray panel 21 is adapted to cover an aperture 28 provided in the first or front panel 13.

With the bird seed feeder means 11 secured in the first position to the packaged container, it may be filled with bird seed through the open foldable top in the same general fashion as milk is fed into the carton. After the packaged container is filled with bird seed, the foldable top may be sealed in the same general manner as that for milk. The folded top may be provided with a hole 30, whereby the packaged container may be suspended by a wire or string hanging from a limb of a tree or other support. With the bird seed feeder means 11 secured in the first position to the first or front side 13 of the packaged container, there is no interference to shipping and storage.

When the purchaser takes a combination packaged container and bird seed feeder means to his home, he can readily remove the pieces of tape and reposition the bird seed feeder means to its second or operative position, whereby the combination is converted into a bird feeder. In the second operative position of the bird seed feeder means 11, the tray or bottom panel 21 is disposed against the base panel means 12 with the first and second opposed side marginal flange means 22 and 23 respectively embracing the third and second opposed side panels 18 and 17 and thence extending outwardly therefrom. The third end marginal flange means 24 is spaced outwardly from and disposed substantially parallel to the first or front side panel 13. The bird seed feeder means 11 may be secured in its second position to the packaged container by reusing the same pieces of tape 27 or by using new tape which is usually available in most homes. The packaged container is thus readily converted into a bird feeder and it may be suspended from a limb of a tree or other support for feeding the birds.

In the suspended position of the combination container-feeder, the bird seed is rendered available to the birds for eating through the aperture 28, which is disposed above the tray or bottom panel 21. The bird seed upon leaving the aperture 28 is disposed to be received by the tray or bottom panel 21. The marginal flange means 22, 23 and 24 keep the bird seed from falling from the tray or bottom panel. The bird seed feeder means 11 in its second or operative position also constitutes perch means upon which the birds may perch while eating bird seed rendered available to them.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Combination packaged container and bird seed feeder means, said packaged container having at least base panel means and a first side panel meeting with said base panel means and defining a first corner edge, said feeder means having at least utility panel means, said feeder means being positionable relative to said packaged container in first and second positions, means for securing said feeder means to said packaged container in said first and second positions, said feeder means in said first position having said utility panel means releasably disposed against said first side panel of said packaged container, said feeder means in said second position having said utility panel means secured underneath and in contact with said base panel and extending outwardly away from said first corner edge, said packaged container having aperture means through which bird seed is rendered available to birds for eating, said aperture means being disposed above said utility panel means in said outwardly extending position, whereby said utility panel means in said outwardly extending position is disposed to receive and render bird seed which comes out of said aperture means available to the birds for eating, said utility panel means in said outwardly extending position also constituting perch means upon which the birds may perch while eating bird seed rendered available to them.

2. The structure of claim 1, wherein said utility panel means includes marginal flange means to keep bird seed from falling therefrom.

3. The structure of claim 1, wherein said first corner edge has first and second spaced ends and wherein said packaged container also has second and third opposed side panels interconnected by said first side panel, said second opposed side panel meeting with said first side panel and defining therewith a second corner edge substantially perpendicular to said first corner edge and extending from said first spaced end thereof, said third opposed side panel meeting with said first side panel and defining a third corner edge substantially perpendicular to said first corner edge and extending from said second spaced end thereof, said utility panel means including a tray panel provided with first and second opposed side marginal flange means and third end marginal flange means, said feeder means in said first position having said tray panel disposed against said first side panel of said packaged container with said first and second opposed side marginal flange means respectively extending beyond said second and third corner edges and thence respectively embracing said second and third opposed side panels of said packaged container and with said third end marginal flange means extending beyond said first corner edge and thence embracing said base panel means, said feeder means in said second position having said tray panel disposed against said base panel means with said first and second opposed side marginal flange means respectively embracing said third and second opposed side panels and thence extending outwardly therefrom and with said third end marginal flange means spaced outwardly from and disposed substantially parallel to said first side panel.

4. The structure of claim 1, wherein said packaged container comprises a structure substantially the same as a milk carton.

5. The structure of claim 1, wherein said means for securing said bird seed feeder means to said packaged container comprises water-proof adhesive tape means.

6. The structure of claim 1, wherein said bird seed feeder means is constructed of metal.

7. The structure of claim 1, wherein said bird seed feeder means is constructed of the same material as that of a milk carton.

References Cited

UNITED STATES PATENTS

| | | | |
|---|---|---|---|
| 2,775,226 | 12/1956 | Early | 119—52 |
| 2,891,711 | 6/1959 | Early | 229—17 |
| 3,089,462 | 5/1963 | Brockmann | 119—52 |
| 3,115,865 | 12/1963 | Parkes et al. | 119—52 |
| 3,179,244 | 4/1965 | Kuhn | 206—47 |

ALDRICH F. MEDBERY, *Primary Examiner.*